United States Patent [19]
Delcuve et al.

[11] Patent Number: 5,658,629
[45] Date of Patent: Aug. 19, 1997

[54] DOUBLE-SIDED SILICONE COATED LINER

[75] Inventors: Christian Delcuve, Houdeng-Geognies; Claude Pasti, Ecaussinnes; Guy Siraux, Mignault, all of Belgium

[73] Assignee: Morgan Adhesives Company, Stow, Ohio

[21] Appl. No.: 302,656

[22] PCT Filed: Mar. 3, 1994

[86] PCT No.: PCT/US94/02290

§ 371 Date: Sep. 1, 1994

§ 102(e) Date: Sep. 1, 1994

[87] PCT Pub. No.: WO95/23693

PCT Pub. Date: Sep. 8, 1995

[51] Int. Cl.⁶ ..................................................... B32B 7/12
[52] U.S. Cl. ................... 428/41.3; 428/343; 428/352; 428/354; 428/447; 428/913
[58] Field of Search .......................... 428/40, 343, 352, 428/354, 447, 913

[56] References Cited

U.S. PATENT DOCUMENTS

| | | | |
|---|---|---|---|
| 4,761,320 | 8/1988 | Coburn, Jr. | 428/167 |
| 4,867,828 | 9/1989 | McIntyre | 156/247 |
| 4,871,611 | 10/1989 | LeBel | 428/266 |
| 5,108,782 | 4/1992 | Reed . | |
| 5,154,956 | 10/1992 | Fradrich | 428/40 |
| 5,229,212 | 7/1993 | Reed . | |
| 5,230,944 | 7/1993 | Beer et al. . | |
| 5,248,535 | 9/1993 | Chang et al. | 428/40 |
| 5,281,288 | 1/1994 | Murray et al. | 156/83 |
| 5,298,325 | 3/1994 | Culbertson . | |
| 5,354,588 | 10/1994 | Mitchell et al. | 428/40 |

*Primary Examiner*—Daniel Zirker
*Attorney, Agent, or Firm*—Oldham & Oldham Co., L.P.A.

[57] ABSTRACT

A double-sided silicone-coated liner, particularly adapted for use in self-wound tapes is described which is a paper upon which a silicone coating layer is deposited on one surface and a water vapor permeable silicone coating layer is applied on the liner's opposed second surface. The liner surfaces may optionally be clay coated, the clay coating adjacent to the water vapor permeable silicone coating layer also having water vapor permeability.

The tape made using this particular liner typically additionally has a carrier layer with an adhesive sandwiched between the silicone coating layer and the carrier. The tape is prepared by the steps of coating the liner with a silicone layer on a first side of the liner; drying the silicone layer; coating an adhesive onto an exposed surface of the silicone layer; laminating a carrier layer onto the adhesive; coating a second side of the liner, opposed from the first side with a water vapor permeable silicone layer; drying the water vapor permeable silicone layer; and remoisturizing the liner.

11 Claims, 4 Drawing Sheets

DOUBLE-SIDED SILICONE COATED LINER

TECHNICAL FIELD

The invention described herein pertains generally to release liners which have been silicone-coated on both sides.

BACKGROUND OF THE INVENTION

The liner of pressure-sensitive products can be of different types, based on a film, a paper, or a combination of both. For self-wound tapes, the liner must be silicone coated on both sides.

Film liners can be silicone coated on both sides, and are stable with respect to the ambient air humidity. However, they are expensive and consequently of limited use. Only when the cost of the total construction can justify the price differential between the subsequently described alternatives, can this solution be implemented commercially. Paper liners, generally a glassine (highly calendered) type of paper, can also be easily silicone coated on both sides, are relatively inexpensive, but suffer regarding ambient air humidity characteristics. Composite liners, made out of paper and film, can easily be silicone coated on both sides, but are either not stable to ambient air humidity or are expensive.

Alternative solutions can involve the use of a clay-coated kraft liner, which is widely used for single-side pressure sensitive labels, etc. The main advantages of this type of liner is that it lies flat, possesses good dimensional stability and obtains these properties at a reasonable price. The clay coating provides a smooth surface with good hold out, an important characteristic for applying a thermally or radiation curable silicone coating, by any technique.

In order to use this type of liner for self-wound tapes, it traditionally would have been clay-coated on both sides, to provide enough hold-out thereby allowing silicone coating on both sides without a great deal of saturation of the paper. However, a problem which arises when the same coating is applied to both the front and back sides of this type of liner, is that a "bursting" of the paper is likely to occur during passage of the liner through the drying ovens. The "bursting" is induced by the moisture contained in the paper which cannot come out during the thermal drying/curing of the silicone coating as these clay coatings are relatively impervious to water vapor migration. Moreover, this characteristic does not allow proper remoisturization of the liner after the drying/curing of the silicone, which is an essential step to keep the targeted final product characteristics, particularly good dimensional stability (i.e., the product will lay flat).

Standard one-side clay-coated kraft has also been tested in prior art solutions, but requires a high silicone coating weight, sufficient to completely soak the liner with silicone. This mitigates against the economic attractiveness of the process. Additionally, such a heavy silicone coating weight makes it impossible to properly remoisturize the liner after drying/curing of the silicone.

Thus, as can be seen, prior art solutions to the problem have yet to satisfactorily solve the technical issues facing the manufacture of smooth double silicone-coated liners, which are free from undesirable defects on the surface.

SUMMARY OF THE INVENTION

In accordance with the present invention, there is provided a double silicon-coated liner which is adapted for self-wound tapes, while showing good dimensional stabililiy when compared to former glassine-type liners, and at an attractive cost to film liners.

It is another object of this invention to provide a liner with at least one side relatively porous to water vapor migration.

It is still another object of this invention to provide a process for silicone coating a paper on both sides, wherein the silicone coating is smooth, free from undesirable defects on the surface, allows for adequate remoisturization and is economic.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
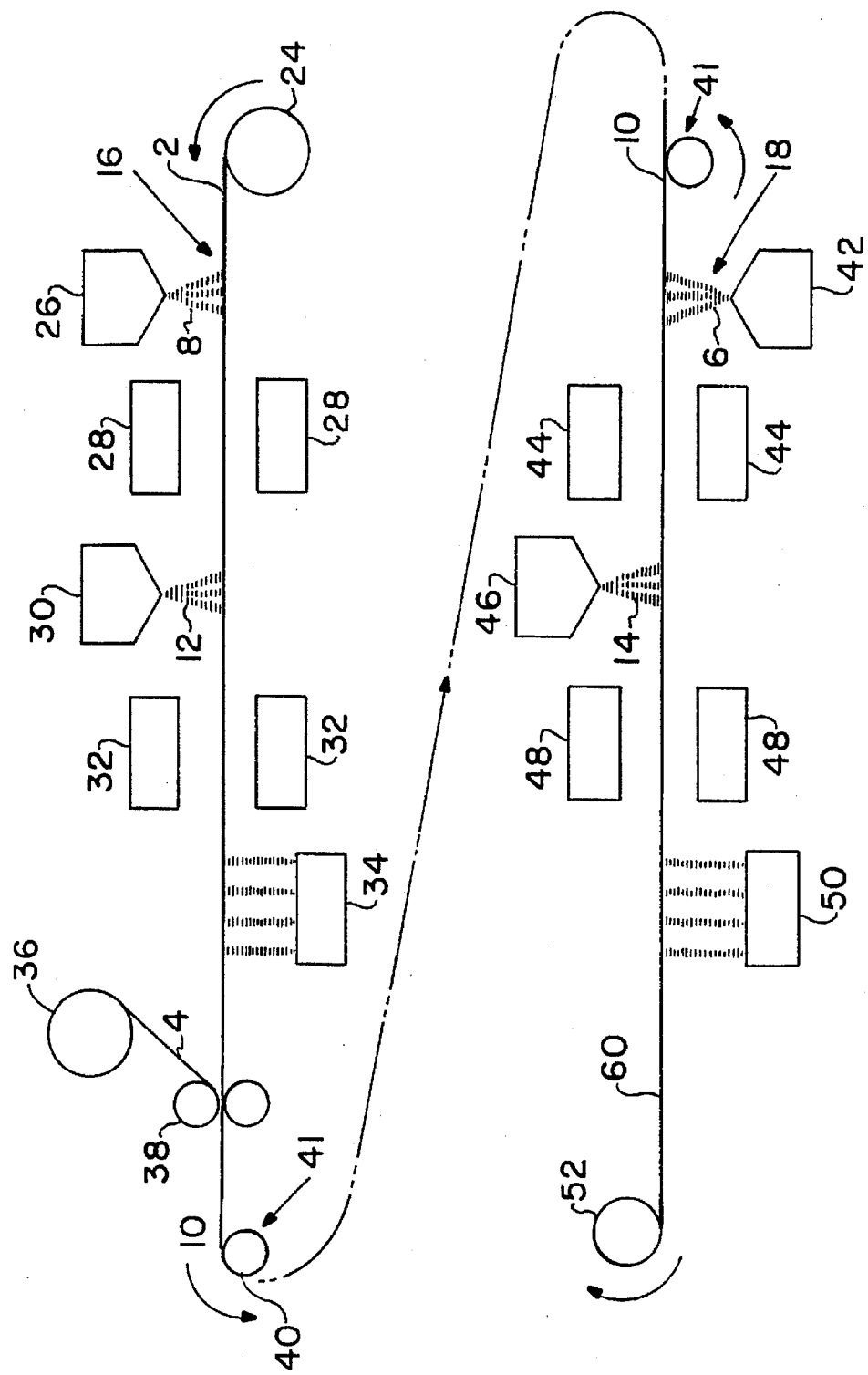
FIG. 1 is a process schematic for making a double-sided self-wound tape with carrier using a two pass process.

Referring now to the drawings wherein the showings are for purposes of illustrating the preferred embodiment of the invention only and not for purposes of limiting the same, the Figures show a double sided liner which has been siliconized on both sides, yet which is not subject to "bursting" or "cracking".

Figure 2:
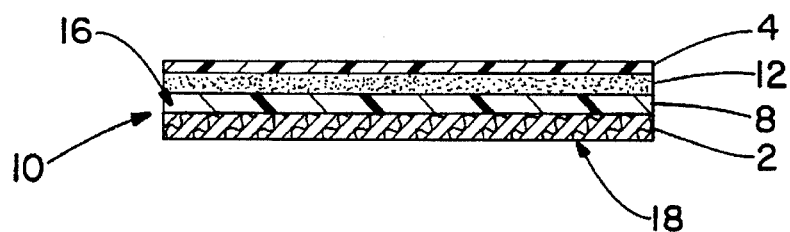
FIG. 2 is an expanded view in cross-sectional of an intermediate product produced after the completion of the first pass in the process shown in FIG. 1.

FIG. 1 shows a process for making a double-sided self-wound tape. While the tape is shown being prepared using a dual pass, there is no need to limit the invention to such. The process can just as easily be practiced in one pass, in two passes, or in more than two passes, depending upon the available equipment. In the first pass, base liner 2 is unwound from base roll 24 and silicone coated with a first silicone formulation on one side 16 of base liner 2 at a first silicone coating station 26 to produce a liner with a single-sided silicone coating 8. The silicone coating is dried and/or cured in the drying and/or curing oven 28. An adhesive layer 12 is then coated on top of silicone coating 8 at an adhesive coating station 30. The adhesive layer is dried and/or cured in drying and/or curing ovens 32, if necessary. If the adhesive used was a hot-melt adhesive, then the drying step is replaced with cooling. Likewise, if the adhesive is a radiation cured adhesive, then drying would be replaced by curing lamps. The product, which has a single silicone coating and an adhesive coating is remoisturized at remoisturizing station 34 through the non-silicone coated side of base liner 2. Typically a carrier 4, unwound from carrier roll 36 is laminated on the adhesive 12 at laminating station 38. The tape is then rewound at rewind station 40 to make a roll 41. The intermediate product 10 of this first pass is shown in an expanded cross-sectional view in FIG. 2.

Figure 3:
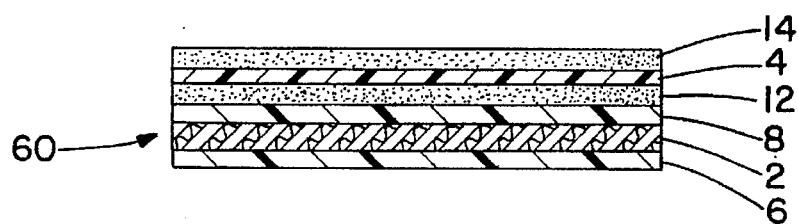
FIG. 3 is an expanded view in cross-sectional of the double-sided self-wound tape as realized after the completion of the second pass in the process shown in FIG. 1.

In a second pass, the tape 10 of the first pass is unwound from roll 41 and silicone coated with a second silicone coating 6 on side 18, at a second silicone coating station 42. It should be noted that side 18 is the not yet silicone coated side of base liner 2. This silicone coating 6 is dried and/or cured in drying and/or curing oven 44. A second adhesive coating 14 is applied on top of carrier 4 at adhesive coating station 46 with resultant adhesive drying and/or curing in drying and/or curing oven 48. Once again, if the adhesive used was a hot-melt adhesive, then the drying step is replaced with cooling. An appropriate amount of moisture is reapplied to the tape through the second silicone coating 6 at a second remoisturization station 50 and the final tape product 60 is rewound at rewind station 52. An expanded cross-sectional view of this tape 60 is shown in FIG. 3.

In the above process, there is no requirement that either the first or the second silicone layers be the same, and may in fact, be different in thickness and/or composition. Similarly, there is also no requirement that either the first or second adhesive layers be the same, and may in fact, be different in thickness and/or composition.

Base 2, in a preferred embodiment, will be a kraft paper. This paper can be generally described as a paper made entirely from wood pulp produced by a modified sulfate pulping process. It is a comparatively coarse paper particularly noted for its strength. It is usually manufactured on a fourdrinier machine with a regular machine-finished or machine-glazed surface. It can be watermarked, striped, or calendered, and has an acceptable surface for printing. Kraft paper is most commonly made in basis weights from 25 to 60 pounds (40–100 g/m$^2$), but may be made in weights ranging from 18 to 200 pounds (30–300 g/m$^2$).

In a most preferred embodiment, the kraft paper will be clay coated on both sides, although the water vapor permeability characteristics of the clay coatings will be different. In general, clay is a natural, earthy, fine-grained material which develops plasticity when wetted but is hard when baked or fired. In papermaking, those clays containing predominantly the clay mineral kaolinite are the most important and are used both as filler and as coating pigments. The paper may additionally be calender finished, a term which is applied to any paper with a surface glazed by means of calenders or supercalenders.

While a kraft paper which is coated on both sides is typically used, there is no need to limit the invention to such. A single side clay coated paper could also be used to produce a stable liner. To provide sufficient holdout for the silicone coating however, it would be desirable to use a chemical coating (e.g., cellulosic, associative and polymeric thickeners) on the non-clay coated side which allows passage of water to moisturize the paper. The coating must be capable of being silicone coated and typically ink-receptive.

Figure 7:
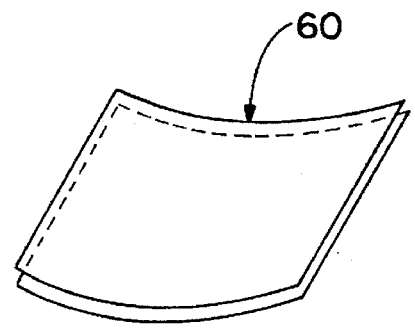
FIG. 7 is an enlarged perspective view of the liner showing the "curl" effect induced by the shrinkage or elongation of the liner, due to ambient air humidity variations, if the liner is not stable with respect to this physical parameter.
Figure 8:
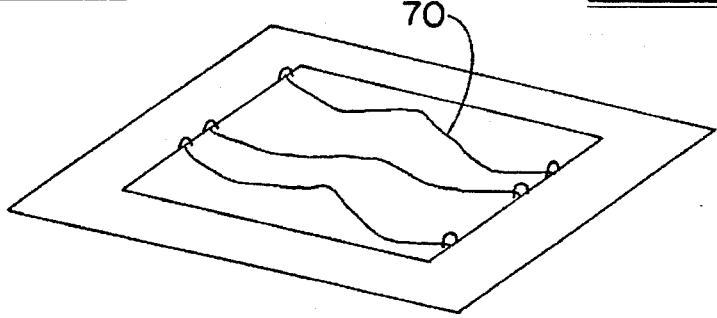
FIG. 8 is an enlarged perspective view of the liner showing "tunnels" when a prior art tape is applied to a flat board surface and exposed to humidity variations.

In a most preferred embodiment, base 2 will be more open and less compacted than a supercalandered paper (glassine type), thereby showing less change in dimensions with change in moisture levels than with a comparable supercalandered paper. Good stability to changes in moisture levels of a silicone-coated two-sided release liner is important. If the base liner 2 shows changes in dimensions through the loss or gain of moisture, curl of the tape 60 will occur as shown in FIG. 7. This will result in excessive scrap and production down-time at the customer site, where product will be unacceptable. Moreover, if the adhesive coating 14 of the tape is laminated to a board, for example to fix large objects such as photographs, tunnels or wrinkles 70 as shown on FIG. 8, will damage the appearance of adhesive layer 12, which will later damage the photograph laminated onto it.

Figure 6:
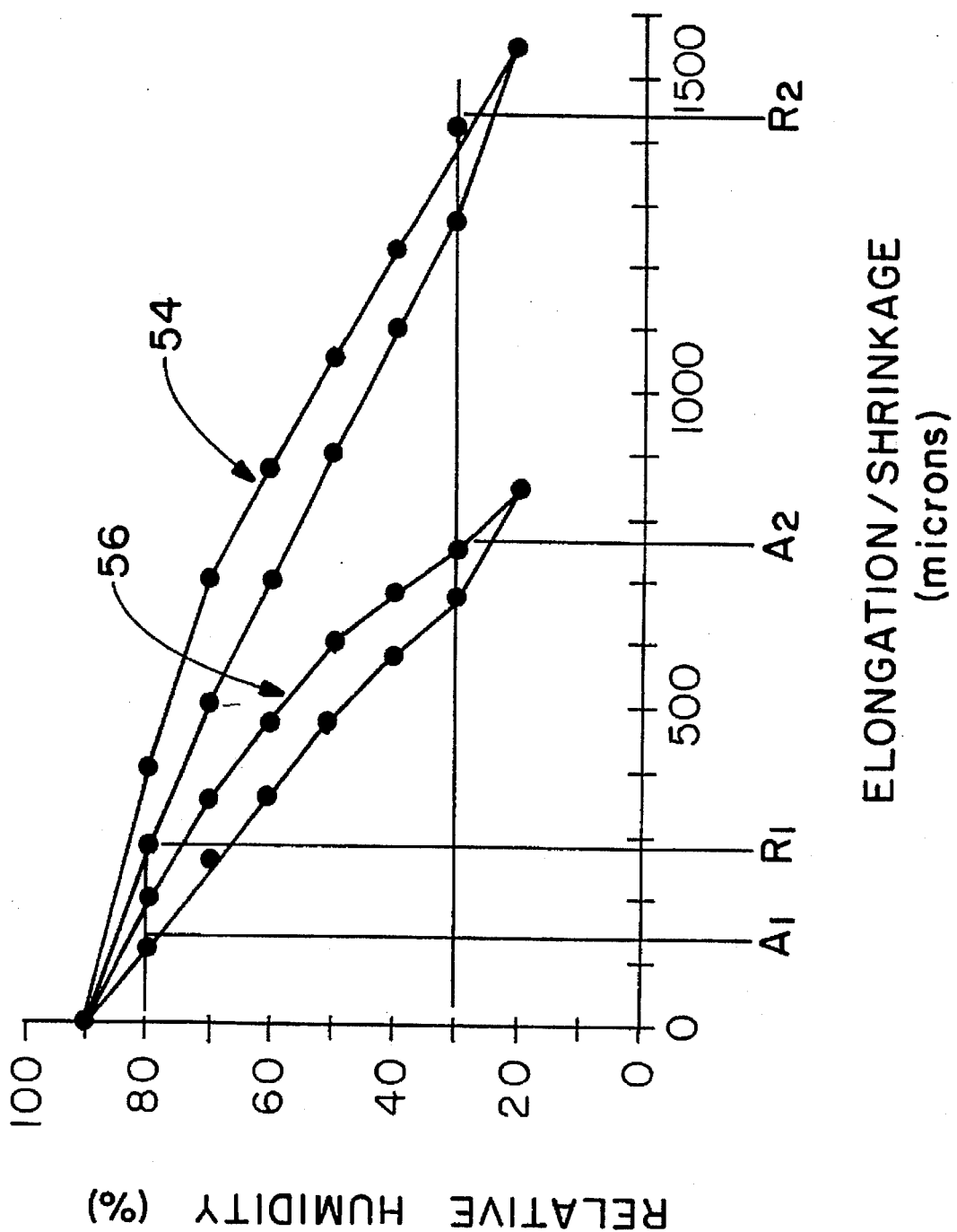
FIG. 6 is a graph showing the dimensional stability of the double silicone-coated liner made by the process of FIG. 1 showing the dimensional stability of the product in relationship to the prior art glassine type liner.

The paper used in the invention has far better dimensional stability than prior art calendered paper, as seen in FIG. 6 showing the elongation/shrinkage relationship of both kinds of paper as a function of the percent relative humidity. A sample of the paper was placed between two jaws in a controlled climate oven. One jaw was fixed on a frame and the other one was connected to an electronic extensiometer able to detect variations as low as 1 micron. The distance between the two jaws was initially set at 100 mm. The sample was then conditioned for two hours at 90% relative humidity. After this conditioning period, the value read on the extensiometer corresponded to the zero point. The relative moisture was then reduced step by step (every 10% relative humidity) from 90% to 20%. At each step, a point was obtained which was plotted in FIG. 6. This provided the desorption curve of the evaluated sample. Correspondingly, measurements from 20% to 90% relative humidity provided the data for the absorption curve for the paper.

The hysteresis shrinkage/elongation curve of the silicone coated paper of this invention using CHAM 623, commercially available from Cham Tenero, Switzerland as the clay-coated kraft paper base, shown by reference numeral 56, is roughly half of that exhibited by one of the best glassine liners, shown by reference numeral 54, known of the prior art. This figure indicates that the paper of this invention will change less in dimensions when subject to changes in relative moisture humidity. The significance of this resides in the fact that tapes of this sort are often stored in areas where the relative humidity can vary from 30 to 80% relative humidity. For the paper of the invention, the dimensional change in the paper between 30% and 80% relative humidity corresponds to the positions marked as $A_2-A_1=780-140=640$ microns for 100 mm evaluated. The corresponding prior art paper dimensional changes between the same relative humidity differences corresponds to the positions marked as $R_2-R_1=1440-280=1160$ microns. The paper of the instant invention will lie significantly flatter than that of the prior art.

The silicone formulations which are applicable to this type of invention are quite varied in scope. Silicone, as used in this application refers to any organosilicon oxide polymer in which the structural unit is

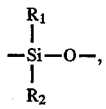

where $R_1$ and $R_2$ are monovalent organic radicals. The physical properties of silicones depend on the size and type of the radical, the R/Si ratio, and the molecular configuration of the polymer (i.e. linear, cyclic, degree of crosslinking). These products are characterized by high thermal and chemical stability and unusual release from sticking and surface properties. The silicones can be solvent-based or solventless, emulsion based or radiation cured.

One of the important facets of the invention is in the recognition of the interrelatedness of the liner barrier coating and silicone coating which is applied to the printing or water vapor permeable side of the liner, i.e., side 18. Both the barrier coating and the silicone coating must function so as to permit the passage of water vapor both in and out of the liner.

Figure 9:
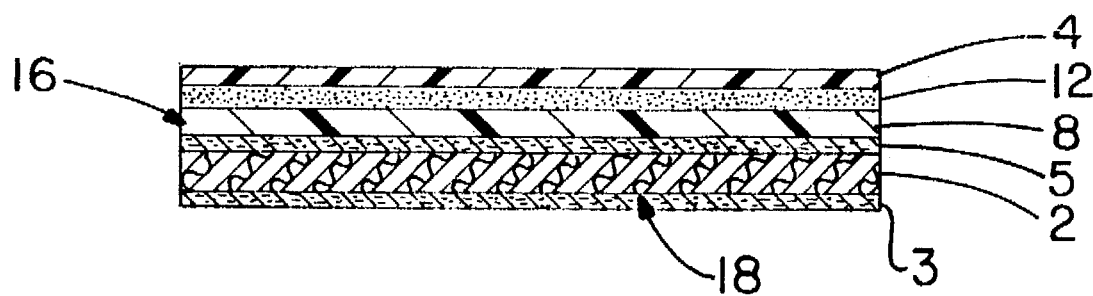
FIG. 9 is an expanded view in cross-section of a product similar to that shown in FIG. 2.
Figure 10:
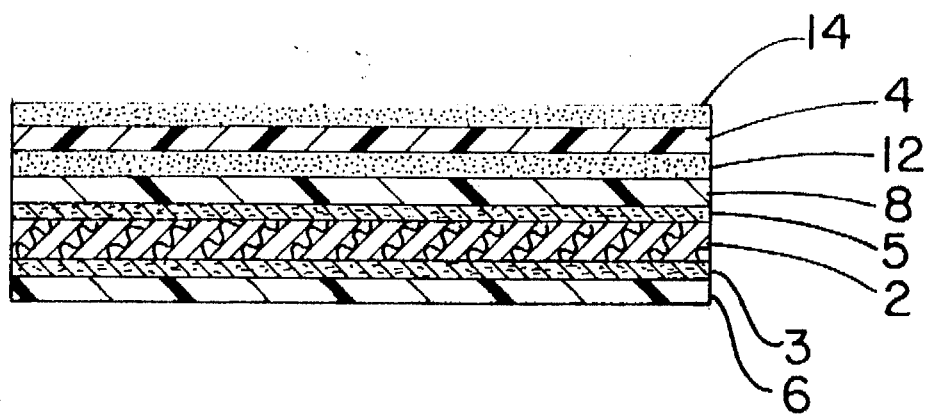
FIG. 10 is an expanded view in cross-section of a product similar to that shown in FIG. 3.

As shown in FIGS. 9–10, for most applications, base 2 will be clay coated (3,5) on sides 16 and 18. The clay coating upon which silicone coating layer 8 is applied upon, functions primarily to hold out the silicone from the interior of the liner (i.e., to prevent saturation of base 2 with silicone). The clay coating 3 upon which the relatively water vapor permeable silicone coating 6 is applied upon, functions to permit water vapor migration in several instances: (1) water vapor evaporation subsequent to the drying/curing of the first silicone layer in the first silicone drying oven 28; (2) water vapor reabsorption of a targeted amount of moisture at remoisturizing station 34; (3) water vapor evaporation subsequent to the drying/curing of the second silicone layer in the second silicone drying oven 44; and (4) water vapor reabsorption of a targeted amount of moisture at remoisturization station 50.

The goal of this remoisturization is to bring the liner to a moisture level which closely approximates that found under ambient conditions with 50% relative humidity. This will further minimize dimensional variations faced by the product during relative humidity swings from 80 to 30%, as might occur at a customer's site. While the use of clay coatings are generally preferred due to the acceptance within the industry, there is no need to limit the application to such. Other sealant coatings, other than clay are envisioned to be a part of the invention which serve to perform the same or similar functions as those previously described. A polyolefin coating would be one such example.

The silicone layer which is coated on side 16 of base liner 2 can be any type of silicone. The second silicone formulation which is to be coated on side 18, in general, and in a most preferred embodiment, will possess sufficient porosity to enable water vapor migration both in and out of the base. The water permeability can be measured by for example, the COBB method (ISO norm 535-1991), in which a sample of paper is weighed just before and immediately after the exposure of one side to water during a given amount of time. The increase in weight, expressed in grams/square meter ($g/m^2$) corresponds to the COBB index. As an example, a COBB 300, coated side, of 0.8 $g/m^2$ means that the coated side of the evaluated paper has been exposed to water for 300 seconds, and the difference in weight (0.8 $g/m^2$) is the quantity of water absorbed by the sample through the coated side.

From Table I, using a COBB 300 index, it can be seen that side 18 is more porous in comparison to side 16, even after silicone coating.

TABLE I

| Base Paper | Silicone | Side 16 | Side 18 |
| --- | --- | --- | --- |
| Cham 623 | before silicone coating | 0.8 to 1 $g/m^2$ | 11 to 13 $g/m^2$ |
|  | after silicone coating | 0.8 to 1 $g/m^2$ | 2.5 to 3 $g/m^2$ |
| Glassine | before silicone coating | 34 to 36 $g/m^2$ | 37 to 39 $g/m^2$ |
|  | after silicone coating | 10 to 12 $g/m^2$ | 14 to 16 $g/m^2$ |

In a preferred embodiment, this water vapor permeable silicone is diluted in an organic solvent prior to application, typically heptane, although other solvents are equally applicable and are well-known in the art, including combinations of solvents (e.g., heptane and toluene).

Figure 5:
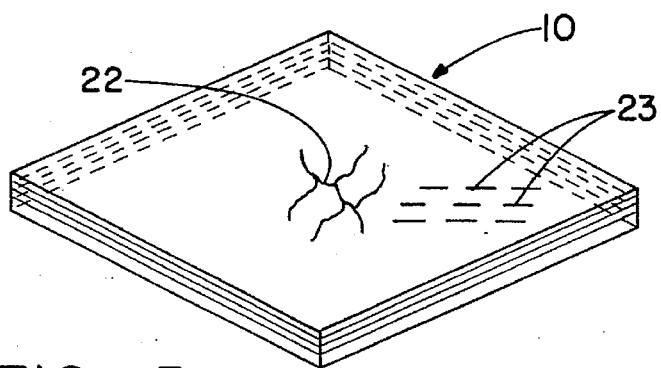
FIG. 5 is a perspective view of the prior art illustrating bursting induced by water contained in the liner paper when a non-water vapor permeable coating is applied to both sides of the liner, and cracking due to inadequate silicone coating.

The choice of the appropriate silicone formulation is critical on the water vapor permeable side of the liner, and also depends upon the adhesive selected for the construction. Inadequate silicone formulation will show tight release, and cracking will be induced. As seen in FIG. 5, cracking will result in cracks (~1 mm long) 23 and bursts 22, which can be seen when unwinding the tape. These defects adversely influence the properties of the product such as release, damage to the adhesive coating, etc.

In general, adhesive layers (12,14) can be solvent-based adhesive (e.g., acrylic or rubber), hot-melt adhesives (e.g., acrylic or rubber), or emulsion adhesives (e.g., acrylic/latex water dispersion) or radiation cured, all such adhesives being capable of flier radiation curing and/or crosslinking, as is known in the industry.

The carrier can be a plastic or paper based. If the carrier is plastic, non-exhaustive exemplary types of suitable polymers would include polyalkylene terephthalates (e.g., polyethylene terephthalate (PET), polyvinyl chloride (PVC), or polyolefins (e.g., polyethylene or polypropylene)). The polymers may contain additives, and in general, usually do, such as antioxidants, fillers, colorants, and other components which are known in the additive art. When the carrier is paper based, non-exhaustive exemplary types of suitable compositions would include tissue, which could be woven or non-woven.

When the carrier layer is polymeric based, equally within the scope of the invention is the concept of a laminated polymer, which contains many layers, each serving specified purposes, which maximize the function of the product at minimal production cost.

EXAMPLES

The following non-limiting examples are illustrative of but a series of exemplary combinations of components which are effective for use in this invention.

| Example #1 | |
| --- | --- |
| Component | Quantity (lbs.) |
| Formula 1: | |
| Toluene | 10 |
| LF Naptha | 63 |
| GE SS-4330 | 12 |
| GE SS-4335 | 2.5 |
| GE SS-4300C | 0.18 |
| Formula 2: | |
| Toluene | 98 |
| Dow Corning Syloff 7362[a] | 18 |
| Dow Corning Syloff 7210 | 2 |
| Dow Corning Syloff 7367[b] | 0.2 |

Example #1

| Component | Quantity (lbs.) |
|---|---|
| Formula 3: | |
| Heptane | 76.6 |
| Dow Corning Syloff 7146[c] | 20 |
| Dow Corning Syloff 7048[d] | 0.15 |
| Dow Corning Syloff 7210 | 3.1 |
| Formula 4: | |
| Tolusol 5 | 81.7 |
| Dow Corning Syloff 23 | 14.7 |
| Dow Corning C-4-2109[e] | 2 |
| Dow Corning C-4-2117[f] | 0.6 |
| Dow Corning 23A Catalyst | 1.3 |
| Formula 5: | |
| Heptane | 70.0 |
| Dow Corning Syloff 23 | 16.7 |
| Toluene | 11.7 |
| Dow Corning C-4-2117[f] | 0.6 |
| Dow Corning 23A Catalyst | 1.3 |
| Formula 6: | |
| Tolusol 5 | 76.6 |
| Dow Corning Syloff 7046 | 20 |
| Dow Corning Syloff 297[g] | 0.2 |
| Dow Corning Syloff 7048[d] | 0.15 |
| Formula 7: | |
| Rhone-Poulenc PC-438[h] | 11.2 |
| Toluene | 59.6 |
| Rhone-Poulenc PC-519[i] | 0.6 |
| Rhone-Poulenc PC-331[j] | 0.15 |
| Formula 8: | |
| Tolusol 5 | 76.6 |
| Dow Corning Syloff 7046 | 14 |
| Dow Corning Syloff 7069 | 2 |
| Dow Corning Syloff 297[g] | 0.2 |
| Dow Corning Syloff 7048[d] | 0.15 |
| Formula 9: | |
| Rhone-Poulenc 71822 | 24.5 |
| Rhone-Poulenc 71823 | 3.5 |
| Water | 42 |
| Formula 10: | |
| Tolusol 20[k] | 60 |
| Rhone-Poulenc PC-438[b] | 7 |
| Rhone-Poulenc PC-477[l] | 4.2 |
| Rhone-Pouleac PC-519[i] | 0.75 |
| Rhone-Poulenc PC-331[j] | 0.15 |
| Formula 11: | |
| Syloff 7610[m] | 11.2 |
| Syloff 7615[n] | 20.8 |
| Syloff 7611[o] | 2.0 |
| Formula 12: | |
| Toluene | 90 |
| Dow Corning Syloff 7690[p] | 5 |
| Dow Corning Syloff 7694[q] | 1 |
| Dow Corning Syloff 7678[r] | 0.22 |
| Dow Corning Syloff 7127[s] | 0.29 |
| Formula 13: | |
| Tolusol 20[k] | 79 |
| GE SS-4164A[t] | 19.8 |
| GE SS-4164B | 0.2 |
| GE SS-4163C | 0.7 |
| Formula 14: | |
| Syloff 7044[u] | 20 |
| Syloff 7069 | 12 |
| Dow Corning 7048[d] | 1.5 |
| Formula 15: | |
| GE SL-6000 | 12 |
| GE SL-6010 | 11 |
| GE SL-6020 | 0.73 |
| GE SL-6030 | 9.6 |
| GE SL-6040 | 0.16 |
| Formula 16: | |
| Heptane | 73 |
| GE SS-4330[v] | 14.5 |
| GE SS-4300C | 0.15 |
| Formula 17: | |
| Toluene | 59.6 |
| Rhone-Poulenc PC-438[h] | 8.2 |
| Rhone-Poulenc PC-290[w] | 1.0 |
| Rhone-Poulenc PC-519[i] | 0.6 |
| Rhone-Poulenc PC-331[j] | 0.15 |
| Formula 18: | |
| Tolusol 5 | 81.7 |
| Wacker Dehesive 940A | 14.9 |
| Wacker Dehesive V24 | 1.3 |
| Wacker Catalyst OL | 0.05 |
| Formula 19: | |
| Heptane | 79 |
| GE SS-4191[x] | 16.4 |
| GE SS-4191B | 0.3 |
| GE SS-4192C[y] | 0.4 |
| GE SS-4259C[z] | 0.4 |

[a] silicone coating
[b] crosslinker mixture of 28% methylhydrogen siloxane and 71% 1-ethynylcyclohexene
[c] silicone coating
[d] polymethylhydrogen siloxane
[e] trimethylated silica in xylene
[f] Fast Cure Additive tetra(2-2-methoxyethoxy)ethoxy)silane
[g] acetoxyvinylglycidoxypropylmethoxy silicone polymer
[h] polymethylhydrogensiloxane and polyorganosiloxanes
[i] polyorganosiloxanes in isopropyl alcohol with platinum catalyst
[j] polydimethyl(methylhydrogen)siloxane
[k] naphtha (petroleum), light aromatic and toluene
[l] polyorganosiloxanes and hydrogenated siloxane
[m] bis-(methoxymethyl)ethyl maleate in silicone
[n] dimethylvinylated and trimethylated silica in silicone resin solution
[o] methylhydrogen siloxane and dimethyl, methylhydrogen siloxane
[p] silicone
[q] bis-(methoxymethyl)ethyl maleate in silicone
[r] dimethyl, methylhydrogen siloxane
[s] silicone catalyst in tetramethyldivinyldisiloxane
[t] dimethylpolysiloxane silanol in toluene and benzene
[u] pentamethylpentavinyl cyclopentasiloxane in silicone
[v] dimethyl-methylvinylsiloxane
[w] 1-ethynlcyclohexanol in polyorganosiloxanes
[x] dimethylpolysiloxane silanol and polymethylhydrogen siloxane in toluene and bezene
[y] silicone catalyst (dibutyl tin diacetate) in toluene and benzene
[z] dimethylaminoethyoxypolysiloxane

Example #2

| Component | Quantity (lbs.) |
|---|---|
| Formula 20: | |
| Toluene | 10 |
| LF Naptha | 63 |
| GE SS-4330 | 14.5 |
| GE SS-4300C | 0.15 |

Example #2

| Component | Quantity (lbs.) |
|---|---|
| Formula 21: | |
| Toluene | 98 |
| Dow Corning Syloff 7362[a] | 20 |
| Dow Corning Syloff 7367[b] | 0.15 |
| Formula 22: | |
| Tolusol 5 | 81.7 |
| Dow Corning Syloff 23 | 16.7 |
| Dow Corning C-4-2117[f] | 2.0 |
| Dow Corning 23A Catalyst[aa] | 1.3 |
| Formula 23: | |
| Rhone-Poulenc 71822 | 24.5 |
| Rhone-Poulenc 71823 | 3.5 |
| Water | 42 |
| Formula 24: | |
| Heptane | 70 |
| Toluene | 11.7 |
| Dow Corning Syloff 23 | 13.4 |
| Dow Corning Syloff 291[bb] | 1 |
| Dow Corning C-4-2117[f] | 0.6 |
| Dow Corning XY-176[dd] | 0.6 |
| Formula 25: | |
| Heptane | 76.6 |
| Dow Corning Syloff 7146[c] | 20 |
| Dow Corning Syloff 7048[d] | 0.15 |
| Formula 26: | |
| Dow Corning Syloff 7610[m] | 31.5 |
| Dow Corning Syloff 7612[cc] | 3.5 |
| Dow Corning Syloff 7611[o] | 1.4 |
| Formula 27: | |
| Tolusol 5 | 76.6 |
| Dow Corning Syloff 7146[c] | 16.5 |
| Dow Corning Syloff 7044[u] | 1.0 |
| Dow Corning Syloff 7048[d] | 0.22 |
| Formula 28: | |
| Toluene | 59.6 |
| Rhone-Poulenc PC-438[h] | 8.2 |
| Rhone-Poulenc PC-247[ee] | 1.0 |
| Rhone-Poulenc PC-519[i] | 0.6 |
| Rhone-Poulenc PC-331[j] | 0.15 |
| Formula 29: | |
| Tolusol 20 | 60 |
| Rhone-Poulenc PC-400[ff] | 11.2 |
| Rhone-Poulenc PC-519[i] | 0.6 |
| Rhone-Poulenc PC-331[j] | 0.15 |
| Formula 30: | |
| Toluene | 90 |
| Dow Corning 7690[p] | 6 |
| Dow Corning 7678[r] | 0.22 |
| Dow Corning 7127[s] | 0.29 |
| Formula 31: | |
| Dow Corning Syloff 7044[u] | 32 |
| Dow Corning Syloff 7048[d] | 1.3 |
| Formula 32: | |
| Tolusol 20 | 79 |
| GE SS-4164A[t] | 13.8 |
| GE SS 4164B | 0.35 |
| GE SL-6000 | 2 |
| GE SS-4163C | 0.9 |
| Formula 33: | |
| Toluene | 59.6 |
| Rhone-Poulenc PC-438[h] | 10.0 |
| Rhone-Poulenc PC-247 | 1.5 |
| Rhone-Poulenc PC-519[i] | 0.75 |
| Rhone-Poulenc PC-331[j] | 0.20 |
| Formula 34: | |
| GE SL-6000 | 12.3 |
| GE SL-6010 | 8.0 |
| GE SL-6020 | 0.55 |
| GE SL-6030 | 3.6 |
| GE SL-6040 | 0.12 |
| Formula 35: | |
| Heptane | 79 |
| GE SS-4330 | 11.5 |
| GE SL-6000 | 2 |
| GE SL-6010 | 0.1 |
| GE SS-4300[v] | 0.18 |
| Formula 36: | |
| Tolusol 5 | 81.7 |
| Wacker Dehesive 940A | 11.8 |
| Wacker Dehesive 920 | 1 |
| Wacker Dehesive V24 | 1.5 |
| Wacker Catalyst OL | 0.08 |
| Formula 37: | |
| Tolusol 5 | 76.6 |
| Dow Corning Syloff 7146[c] | 16.5 |
| Dow Corning Syloff 7044[d] | 1.0 |
| Dow Corning Syolff 7048[d] | 0.22 |
| Formula 38: | |
| Heptane | 79 |
| GE SS-4191[x] | 12.3 |
| GE SS-4290 | 1.5 |
| GE SS-4191B | 0.4 |
| GE SS-4192C[y] | 0.5 |
| GE SS-4259C[z] | 0.4 |

[a] silicone coating
[b] crosslinker mixture of 28% methylhydrogen siloxane and 71% 1-ethynylcyclohexene
[f] Fast Cure Additive tetra(2-2-methoxyethoxy)ethoxy)silane
[aa] dibutyltin di-2-ethylhexoate in xylene
[bb] methylhydrogen siloxane
[dd] dibutyltin diacetate
[c] silicone coating
[d] polymethylhydrogen siloxane
[m] bis-(methoxymethyl)ethyl maleate in silicone
[o] methylhydrogen siloxane and dimethyl, methylhydrogen siloxane
[cc] bis(methoxymethylethyl)maleate in dimethylvinylated and trimethylated silica
[u] pentamethylpentavinyl cyclopentasiloxane in silicone
[h] polymethylhydrogensiloxane and polyorganosiloxanes
[i] polyorganosiloxanes in isopropyl alcohol with platinum catalyst
[j] polydimethyl(methylhydrogen) siloxane
[ee] polyoganosiloxane
[ff] polymethylvinylsiloxanes in toluene
[p] silicone
[r] dimethyl, methylhydrogen siloxane
[s] silicone catalyst in tetramethyldivinyldisiloxane
[t] dimethylpolysiloxane silanol in toluene and benzene
[v] dimethyl-methylvinylsiloxane
[x] dimethylpolysiloxane silanol and polymethylhydrogen siloxane in toluene and benzene
[y] silicone catalyst (dibutyl tin diacetate) in toluene and benzene
[z] dimethylaminoethyoxypolysiloxane

Example #3

CHAM 623, a clay-coated Kraft paper, commercially available from Cham Tenero, Switzerland, was silicone coated using a fast silicone solution selected from Example #1. The added silicone layer was dried and residual moisture contained in the liner migrated through the paper through the non-siliconized side during passage through the drying/curing oven. Adhesive, such as Durotac-480, an acrylic solvent-based adhesive commercially available from National Starch, was applied on this freshly siliconized side and dried. After remoisturization through the uncoated side, the liner was laminated onto a 0.5 mil PET (polyethylene terephthalate) carrier at 1.5 g/100 in$^2$(23 g/m$^2$).

A second silicone addition selected from the group consisting of Example #2 was applied, dried and cured in the ovens. An adhesive was applied directly on the polyester carrier and dried in the adhesive oven. The double silicone-coated liner was remoisturized through the second water vapor permeable silicone layer at the end of the adhesive oven before winding.

Figure 4:
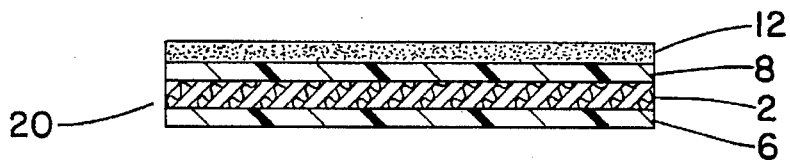
FIG. 4 is an alternative construction of the double-sided product, known as a free film.

While the product is shown with a carrier in FIG. 3, there is no need to include such in the product. As shown in FIG. 4, the tape 20 is shown without a carrier, and is known in the industry as a free film. The tape is constructed similarly to that described previously in relationship to FIG. 3.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A product which comprises:
   (a) a base layer having a first surface which is relatively impermeable to both water vapor and silicone migration and a second opposed surface which is relatively impermeable to silicone migration, but permeable to water vapor migration;
   (b) a first sealant coating layer on the first surface of the base layer which is relatively impermeable to a first silicone coating;
   (c) the first silicone coating layer on an exterior surface of the first sealant coating; and
   (d) a water vapor permeable silicone coating layer on the second surface of the base layer.

2. The product of claim 1 which further comprises:
   (a) a carrier layer having a base-facing side and an opposed exterior side;
   (b) a first adhesive adjacent to the carrier on the base-facing side and adjacent to the first silicone coating; and
   (c) a second adhesive adjacent to the carrier on the exterior side.

3. The product of claim 1 which further comprises a second water vapor permeable sealant coating interposed between the second silicone coating layer and the second surface of the base layer.

4. The product of claim 3 wherein the first and second sealant coatings are selected from the group consisting of clay and polyolefin film.

5. The product of claim 4 wherein the first and second sealant coatings are clay.

6. The product of claim 2 wherein the carrier layer is a polymer layer.

7. The product of claim 1 wherein the polymer in the polymer layer is selected from the group consisting of polyalkylene terephthalates of alkylene number of from $C_{1-4}$, polyvinyl chloride, polyolefins selected from the group consisting of polyethylene, polypropylene, polybutylene and polyisobutylene and blends and laminates thereof.

8. The product of claim 1 wherein the carder layer is paper-based.

9. The product of claim 1 wherein the adhesive is selected from the group consisting of solvent-based adhesives, hot-melt adhesives, emulsion adhesives and radiation cured adhesives.

10. The product of claim 1 wherein the base layer is a paper layer.

11. The product of claim 1 wherein the paper layer is a kraft paper layer.

* * * * *